Oct. 7, 1952   J. F. SWIFT   2,612,754
ROTARY HYDRAULIC TORQUE CONVERTER
Filed July 26, 1946   3 Sheets-Sheet 1

J. F. SWIFT
INVENTOR.

BY C. C. McRae
R. G. Harris
J. R. Faulkner
T. H. Oster

ATTORNEYS.

Oct. 7, 1952          J. F. SWIFT          2,612,754

ROTARY HYDRAULIC TORQUE CONVERTER

Filed July 26, 1946          3 Sheets-Sheet 3

J. F. SWIFT
INVENTOR.

E. C. McRae
R. G. Harris
J. R. Faulkner
T. H. Oster
BY

ATTORNEYS.

Patented Oct. 7, 1952

2,612,754

UNITED STATES PATENT OFFICE 2,612,754

ROTARY HYDRAULIC TORQUE CONVERTER

John F. Swift, Royal Oak, Mich., assignor to Ford Motor Company, Dearborn, Mich., a corporation of Delaware Application July 26, 1946, Serial No. 686,529

4 Claims. (Cl. 60—54)

This invention relates generally to torque converters of the Fottinger type, and has particular reference to improvements in torque converters of the type in which the reaction member is divided into a plurality of sections each associated with an overrunning or one-way brake.

The basic principle of providing a multi-section reaction member in combination with overrunning brake means to permit each section to overrun in one direction in advance of the succeeding section was first mentioned in the patent to Coats, 1,760,480, issued May 27, 1930. With this general arrangement, initially all of the sections function as reaction members, but as the speed of the turbine increases the resultant direction of flow of the fluid from the turbine to the reaction member changes and causes the individual reaction sections to successively overrun, changing the characteristics of the reaction member to those of the remaining stationary sections. Upon obtaining sufficient speed, all of the reaction sections will overrun and the torque converter will then function as a fluid coupling. That this basically sound principle early advanced by Coats has not found successful commercial use has been due to the complexity and certain design deficiencies of the original and early embodiments of the idea. It is accordingly a principal object of the present invention to design a torque converter of this general type in which the design is simplified and previous deficiencies are eliminated.

The stepless torque conversion and other inherent advantages of torque converters makes them ideally suited for use in automatic transmissions for automotive vehicles. Many such transmissions have been designed and some have been built utilizing torque converters in combination with various types of gearing systems and complicated controls to secure the desired operational characteristics for automotive use. The use of such mechanism external to the torque converter itself has been thought necessary for several reasons, and have included gear reductions to increase the maximum torque ratio, gearing to increase the speed of the converter to increase its capacity, mechanism to divide the torque between mechanical and fluid paths to improve the efficiency of the overall transmission, and various automatic controls operated either manually or by speed or torque responsive means to control the various units of the transmission. The present invention seeks to improve the design and operating characteristics of the torque converter itself in an effort to meet the requirements of automotive transmissions without the use of such complicated and expensive external gearing and controls.

The efficiency of a conventional torque converter increases as the speed ratio increases but reaches a maximum at a comparatively low speed ratio and drops quite rapidly as the vehicle speed increases beyond this point. It is an object of the invention to provide a construction in which the efficiency is maintained at very nearly its maximum value throughout the higher speed ratio, and to achieve this improved efficiency within the torque converter itself without relying upon external mechanism such as a differential transmission to divide the torque between mechanical and fluid paths.

With a normal torque converter, different torque and efficiency curves can be obtained by changing the basic design of the converter such as the blading contours, etc. A design which obtains a good efficiency curve and reaches a maximum efficiency at a relatively high speed ratio is accompanied by a lower starting torque ratio, while with a design having a better starting torque ratio the maximum efficiency is reached at a lower and hence less desirable speed ratio. An object of this invention is to obtain a high starting torque ratio to eliminate or minimize the need for external gear reductions, without sacrificing desirable efficiency characteristics.

A further object of the invention is to provide a torque converter having a plurality of reaction sections each coupled by an overrunning brake to a fixed member in which the reaction sections, overrunning brakes and associated parts occupy a minimum of space in both radial and axial directions. For successful operation, it is essential that the unit be made as compact as possible since the loss in power caused by disc friction varies as the cube of the speed and the 5th power of the radial dimension. Compactness in the axial direction is also important to decrease the overall size of the converter since the space available for installation of such mechanism in an automotive vehicle is usually limited and since it is also desirable to decrease the blade area of the reaction member to minimize the blade friction losses. It is also an object to provide means for carrying axial and radial loads which are simple, compact and inexpensive to manufacture. By directly connecting each reaction section to the fixed member through an overrunning brake, rather than by connecting the reaction sections to each other through brakes with the last section connected to the fixed member through a final brake, the loads carried by the overrunning brakes are greatly reduced since they are not cumulative, and consequently the brakes can be reduced in size and simplified in construction.

A still further object is to provide a torque converter of the type mentioned above in which the cages of the overrunning brakes are utilized as bearing members to carry the radial loads of the reaction sections when the sections are overrunning and the brake sprags are inoperative.

By allowing each reaction section to overrun progressively and independently in accordance with the flow vectors within the fluid circuit, turbulent free circulation is maintained which is essential to favorable performance and efficiency. The reaction sections are designed to produce a minimum interference with free circulation after they have been caused to overrun and consequently the interference with the torque conversion of the remaining reaction sections is minimized. That the circulation, or quantity of fluid circulated per second through the converter, is important, follows since the output torque is varied by changing the reaction torque and the latter is directly proportional to the circulation.

Another object of the invention is to form each of the individual blades of the various reaction sections of airfoil contour to provide for a smooth flow of fluid through the reaction sections and to thus improve the efficiency.

A still further object is to provide each of the reaction sections with a different number of blades to reduce or eliminate the harmonic disturbances which would otherwise result when some of the sections are caused to overrun and the blades of the overrunning sections pass those of the stationary sections. It is proposed not only to provide each reaction section with a different number of blades, but also to limit the total number of blades in any one section to a prime number, so that there can be no possibility of harmonic disturbances being set up as the blades of one section pass those of the other sections.

Further objects include providing overlapping core sections between the reaction sections to improve the fluid circulation, the elimination of service problems and the obtaining of smooth, quiet operation together with durability and reliability.

Other objects and advantages will be more apparent as this description proceeds, particularly when considered in connection with the accompanying drawings, in which.

Figures 1, 2, 3:
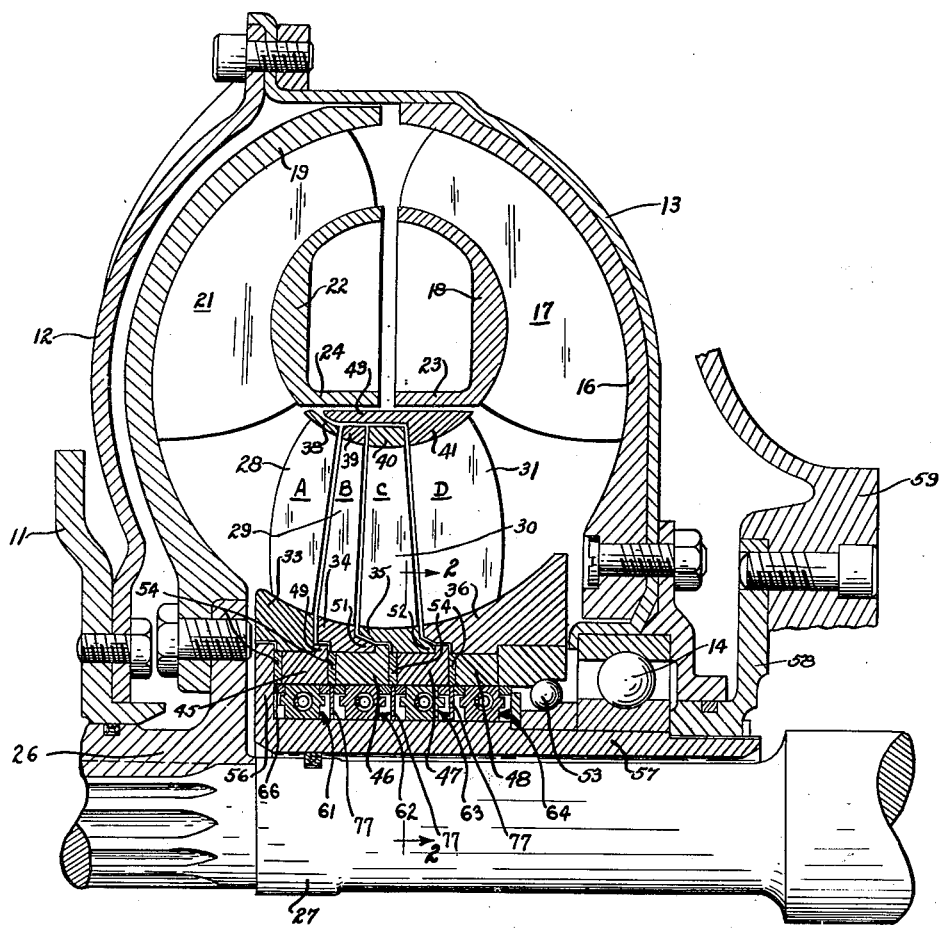
Figure 1 is a fragmentary longitudinal cross sectional view through a torque converter embodying the present invention.
Figure 2 is an enlarged fragmentary cross-sectional view taken substantially on the plane indicated by the line 2—2 of Figure 1.
Figure 3 is a cross sectional view taken on the plane indicated by the line 3—3 of Figure 2.

Referring now to the drawings, and particularly to Figure 1, there is shown a torque converter provided with a driven flange 11 adapted to be connected to the crankshaft or flywheel of an internal combustion engine. The flange 11 is connected to the section 12 of the converter housing which in turn is joined to an adjacent housing section 13, the latter being journaled upon a series of ball bearings 14 to permit rotation of the housing about its axis. Mounted within the housing section 13 is an annular dished member 16 which supports a plurality of impeller blades 17. At the inner ends of the impeller blades 17 is a core section 18 which cooperates with the annular member 16 to provide a fluid path therebetween. A generally similar annular dished member 19 carries a plurality of turbine blades 21 which in turn support the core section 22. It will be noted that the core sections 18 and 22 are complementary in shape and have axially extending inner flanges 23 and 24 respectively to form a substantially closed core in the converter thereby reducing short circuiting of the fluid between high and low pressure sections. The annular member 19 of the turbine is bolted to the flange of a hub 26 splined to the output shaft 27.

The fluid circuit of the torque converter is completed by a multiple section reaction member comprising, in this instance, four reaction sections A, B, C and D. The reaction sections A, B, C and D are formed respectively of reaction blades 28, 29, 30 and 31 mounted between hubs 33, 34, 35 and 36 and core sections 38, 39, 40 and 41 respectively. It will be noted that adjacent reaction blades, hubs and core sections are spaced a slight distance from each other to provide the necessary clearance to avoid any frictional engagement therebetween, but yet are positioned as close together as practically possible to provide a smooth flow of the fluid across the blades.

Figure 6:
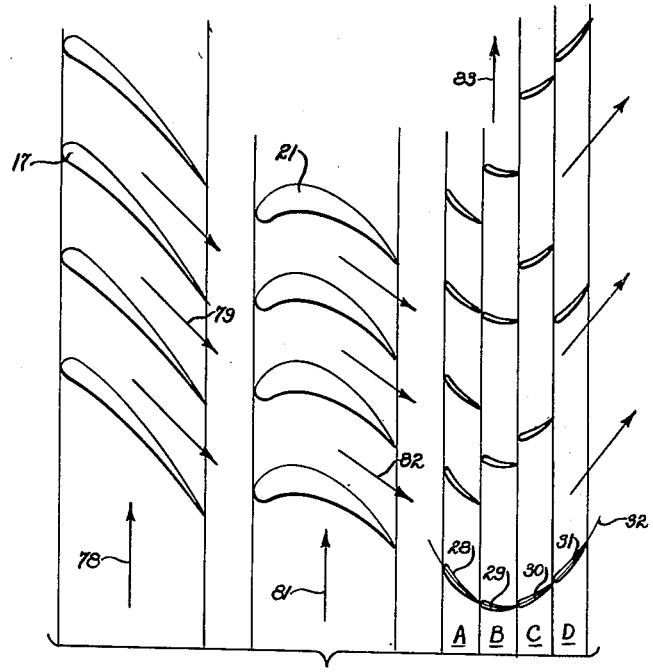
Figure 6 is a diagrammatic view of the blades of the impeller, turbine, and reaction sections.
Figure 7:
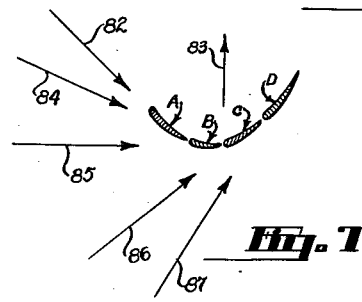
Figure 7 is a diagrammatic view of the reaction sections illustrating the various directions of flow of fluid from the turbine to the reaction member.

It will be noted from an examination of Figures 6 and 7 that the reaction blades 28, 29, 30 and 31 of the reaction sections A, B, C and D respectively are each formed of airfoil contour in cross section to reduce to a minimum any disturbance to the smooth flow of fluid through the reaction sections. As illustrated particularly in the lower right hand portion of Figure 6, the mean camber line 32 of the reaction blades 28, 29, 30 and 31 is also of a smooth airfoil shape.

As shown in Figure 6, the reaction sections 28, 29, 30 and 31 are staggered with respect to each other, there being a different number of blades in each section. This eliminates the possibility of serious harmonic disturbances or vibrations developing in the torque converter due to the blades of one reaction section passing those of the others. If, for example, all of the reaction sections had the same number of blades, the rotation of one or more of the sections while the others remain stationary would result in harmonic vibrations due to the blades of the rotating sections simultaneously passing all of the blades of the stationary sections. To avoid this each section is provided with a different number of blades so that the blades of adjacent sections are staggered. The possibility of harmonic vibrations occurring is further reduced and effectively eliminated by providing each reaction section with a prime number of blades. For example, sections A, B, C and D may be provided with 19, 13, 11 and 7 blades respectively. Since each of these numbers is a prime number there is no possible combination of spacings between the reaction sections which can result in harmonic disturbances.

It will also be noted that reaction section A, which is immediately adjacent the output side of the turbine, contains the larger number of blades and is thus equipped to initiate and direct the proper course of flow through the reaction sections. The succeeding sections B, C and D each contain a progressively decreasing number of blades with section D having the fewest. Inasmuch as the blades 31 of section D have a greater area than the preceding sections, providing section D with a minimum number of blades reduces the total blade area and consequently the blade friction.

The core section 41 of the reaction section D is provided with an axially extending flange 43 extending substantially the entire width of the reaction member and spaced radially inwardly from the core sections 38, 39 and 40. The flange 43 cooperates with the flanges 23 and 24 of the core sections 18 and 22 respectively to substantially close the gap therebetween. It will further be noted that the outer surfaces of all of the core sections 18, 22, 38, 39, 40 and 41 are shaped to conform to each other to provide a smooth outer surface to minimize possible disturbances to the circulating fluid.

The hubs 33, 34, 35 and 36 of the reaction sections are provided with bearing races 45, 46, 47 and 48 respectively which are pressed, welded or otherwise suitably secured within the hubs. The interior surface of each of the bearing races is case hardened to resist wear resulting from engagement with the cooperating overrunning brake, as will be described more in detail hereinafter.

It will be noted that the reaction sections A, B, C and D are relatively narrow in an axial direction to reduce blade friction and to provide the desired operating characteristics for the converter. Inasmuch as each reaction section must be mounted upon bearings for rotation and radial location, provided with means for axial location and to take axial thrust in both directions, and connected to a fixed member through an overrunning brake, it will be seen that space is at a premium. The present construction derives additional axial support for the narrow reaction blades by offsetting certain of the hubs of the reaction sections and the cooperating bearing races. Specifically, it will be noted that the inner bearing race 45 for section A is offset with respect to the hub 33 and is provided with a shoulder 49 engaging one end of the hub 33 to assist in locating the race and hub during assembly and to take part of the axial thrust from the reaction section. A similar construction was provided for the reaction sections B and C and their cooperating bearing races 46 and 47, it being further noted that the hubs 34 and 35 overlap the bearing races for the adjacent sections and have offset flanges 51 and 52 respectively enabling the bearing race for each section to be of the same width irrespective of the variations in width between the sections. The hub 36 of the reaction section D is somewhat enlarged to not only overlap the bearing race for the adjacent section but also to provide a support for the thrust bearing 53. Thrust washers 54 are provided between the bearing races 45, 46, 47 and 48 and between the bearing race 45 and the radial flange 56 of the fixed sleeve 57. The thrust washers 54 may be mounted loosely, or preferably may be brazed or pressed within the adjacent hubs of the reaction sections.

It will be apparent that the construction thus far described is compact in an axial direction yet is sturdily constructed and designed to adequately take the thrust from the reaction blades in either direction. Fluid impinging upon the surface of the reaction blades when the latter are functioning as reaction members causes a thrust force in one direction, while the fluid impinging upon the back of the blades when the latter are caused to overrun results in a thrust force in the opposite direction. These thrust forces are transmitted through the bearing races and the interposed thrust washers 54 to either of the flange 56 of the fixed sleeve or to the thrust bearing 53, depending upon the direction of thrust. In some instances the thrust force on individual blades will be in opposite directions and will partially balance each other.

The fixed sleeve 57 encircles the output shaft 27 and is splined at one end to the hub of a member 58 which is bolted to the stationary transmission housing 59. Preferably the outer surface of the sleeve 57 is also case hardened to resist wear from the action of the overrunning brakes.

Interposed between the fixed sleeve 57 and the bearing races 45, 46, 47 and 48 are overrunning brakes 61, 62, 63 and 64. Inasmuch as the brakes are identical in construction, only one will be described in detail. The brake 61 is contained within a cage 66 formed of bronze or other bearing material. The cage 66 comprises a rim 67 and radially extending flanges 68 at opposite sides therein. The rim 67 is provided with a plurality of angularly spaced slots 69 cut therethrough, and the flanges 68 are cut away to form notches 71 in radial alignment with each of the slots 69. The inner edges of the flanges 68 between the notches 71 are concentric with the outer surface of the rim 67 and engage the outer surface of the fixed sleeve 57 with a sliding fit, while the outer surface of the rim similarly engages the inner surface of the bearing race 45. The overrunning brake cage 66 thus forms a bearing member between the sleeve 57 and the race 45 and absorbs the radial loads when the reaction section A is overrunning the fixed sleeve 57.

Contained within the cage 66 are a plurality of gripper cams or sprags 73, the outer surfaces of which extend through the slots 69 in the rim 67. The continuous coil spring 74 is threaded through holes 76 in the sprags and functions to tip the latter so that they maintain at all times light frictional contact with the sleeve 57 and the bearing race 45. A positive brake is thus provided which prevents rotation of the reaction section A when the fluid flowing through the torque converter impinges upon the face of the blades 28. When, however, the reaction upon the blades 28 reverses due to the direction of flow of the fluid changing so that it impinges upon the back of the blades 28, the overrunning brake 61 releases instantly and runs free.

The overrunning brakes 62, 63 and 64 are identical in construction with the brake 61, and are separated from each other by hardened spacers or washers 77.

It will be observed that the foregoing construction is exceedingly compact thus enabling both the radial and axial dimensions of the torque converter to be maintained small enough to prevent excessive losses. This is a valuable feature since it is not necessary to increase the radial dimension of the converter beyond that required to secure the capacity for the particular installation. Consequently, the disc friction losses which vary as the 5th power of the radius are maintained as small as possible. The compactness of the construction is in part due to the dual function of the overrunning brake cages, which are formed of bearing material and take the radial loads from the reaction sections, thus eliminating the need for separate bearings which would complicate the construction and occupy additional space.

The construction is further simplified and the stresses reduced by providing an overrunning brake between each reaction section and the fixed member, rather than by providing overrunning brakes between adjacent reaction sections with a final overrunning brake between the last section and the fixed member. With the latter arrangement, the stresses accumulate, whereas with the present construction each overrunning brake need only carry the load of its particular reaction section.

Operation

Figure 4:
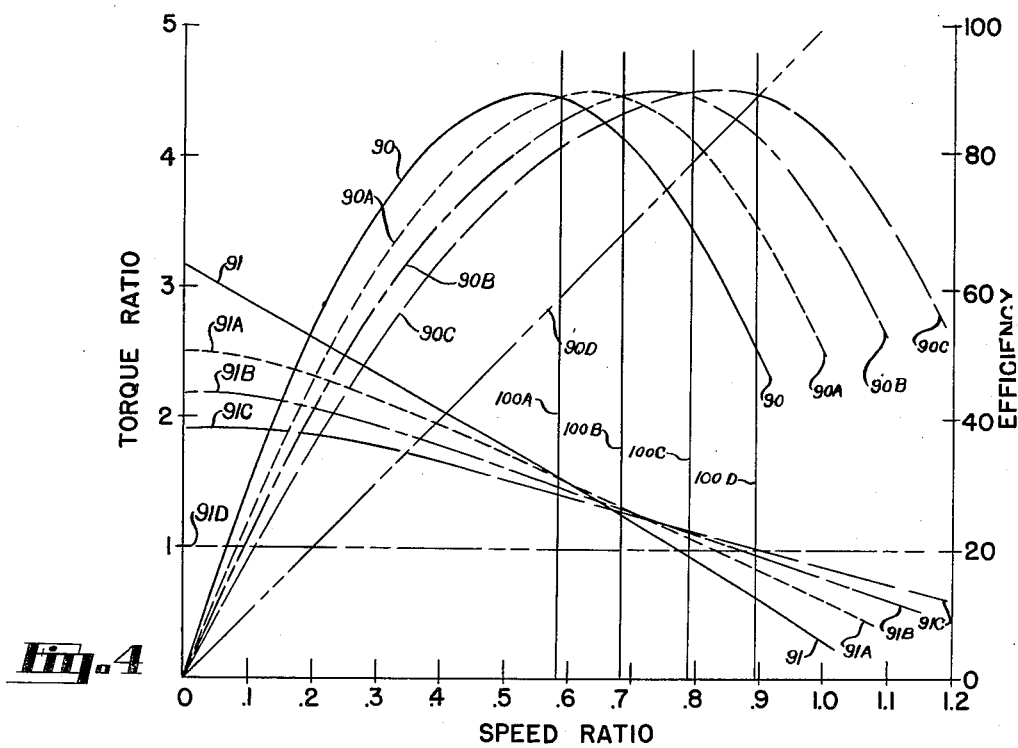
Figures 4 and 5 are graphs showing performance characteristics of the converter.
Figure 5:
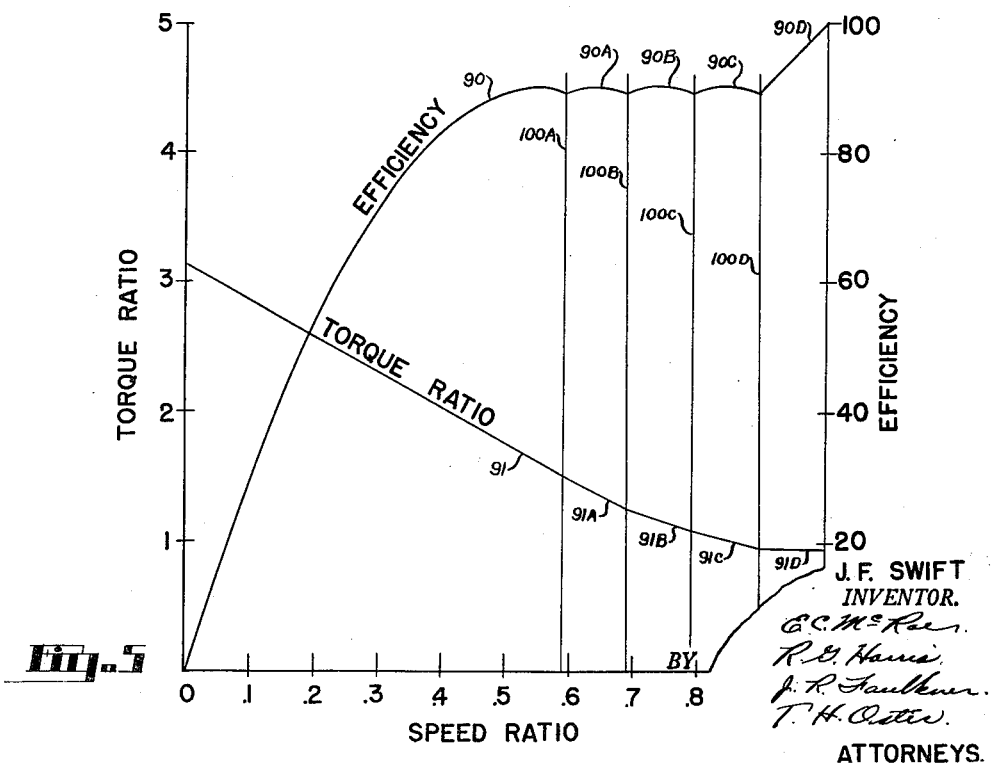
Figure 8:
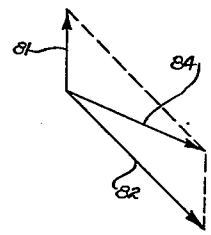
Figure 8 is a vector diagram illustrating the fluid flow from the turbine to the reaction member under certain conditions.

The operation of the torque converter will be more apparent when considered in connection with the torque and efficiency curves shown in Figures 4 and 5, and the diagrams shown in Figures 6, 7 and 8. Figure 6 illustrates the fluid flow through the impeller, turbine and reaction blades. The impeller blades 17 rotate in the direction of the arrow 78, the arrows 79 representing the direction of fluid flow as determined by the blades alone without consideration to circumferential rotation of the impeller. The turbine blades 21 rotate in the direction of the arrow 81, the arrows 82 indicating the direction of fluid flow through the blades when the latter are stationary, as determined by the curvature of the blades themselves. The reaction sections A, B, C and D are free to rotate in the direction of the arrow 83 through their respective overrunning brakes, but are restrained from rotation in the reverse direction.

Referring to Figure 7, under starting conditions with the turbine stationary, the flow of fluid from the turbine to the reaction sections is in the direction of the arrow 82, and it will be noted that the fluid impinges upon the face of all of the reaction sections so that the sections A, B, C and D cooperate to form a complete reaction member. When, however, the turbine begins to rotate, a circumferential movement is imparted to the fluid in the direction of the arrow 81. As shown in the vector diagram in Figure 8, the component 81 resulting from circumferential movement of the turbine and the component 82 resulting from fluid flow between the turbine blades combine to provide a resultant component in the direction of the arrow 84. Referring again to Figure 7, it will be seen that fluid flow in the direction of the arrow 84 impinges upon the back of the reaction section A, causing the latter to overrun in the direction of the arrow 83. The reaction is now taken entirely by the remaining three reaction sections B, C and D since the section A merely coasts or runs free. As the speed of rotation of the turbine increases further, the component 81 increases and the resultant direction of fluid flow from the turbine to the reaction member progressively changes angularly in a counterclockwise direction. When in the direction of the arrow 85, the fluid impinges upon the back not only of reaction section A but also reaction section B, causing the latter to overrun. Under these conditions the reaction is taken only by sections C and D. As the turbine speed increases still further, fluid flow in the direction of the arrow 86 causes section C to overrun, and finally when in the direction of the arrow 87 causes section D to overrun, under which circumstances the converter functions as a fluid coupling since there remains no member to take the reaction torque.

From the foregoing it will be apparent that the size and shape of the total effective reaction member, as defined by the reaction sections which are not overrunning, change progressively as the turbine speed ratio increases. This change in the reaction member changes the characteristics of the torque converter, as will be best seen from an examination of Figure 4, which shows the torque ratio and efficiency curves for the various effective reaction members. The efficiency and torque curves 90 and 91 respectively represent the characteristics of the torque converter when all of the reaction sections A, B, C and D are taking the reaction torque. Curves 90A and 91A represent the condition when reaction section A is overrunning, curves 90B and 91B when both sections A and B are overrunning, curves 90C and 91C when sections A, B and C are overrunning, and finally curves 90D and 91D represent the performance of the device when section D overruns and the unit functions as a fluid coupling.

The torque converter is designed so that the direction of fluid flow from the turbine to the reaction member will be such that the reaction sections A, B, C and D will be successively caused to overrun at speed ratios corresponding to the vertical lines 100A, 100B, 100C and 100D respectively in Figure 4. As a result, the performance of the converter is shown by curves 90 and 91 up to the vertical line 100A, by curves 90A and 91A from line 100A to 100B, by curves 90B and 91B from line 100B to 100C, by curves 90C and 91C from line 100C to 100D, and by the coupling curves 90D and 91D above the speed ratio represented by line 100D.

The resulting performance of the four reaction section torque converter of the present invention is shown by the curve of Figure 5. It will readily be apparent that the efficiency remains at nearly a maximum value from approximately .5 speed ratio to .9 speed ratio and that the usual decrease in the operating efficiency of a torque converter after an intermediate speed ratio has been reached is therefore minimized. It is therefore practical to utilize this torque converter alone as a transmission for an automotive vehicle without the necessity of resorting to various external gearing systems and complicated controls to obtain the performance desired. For example, transmissions in which the torque is divided between a torque converter and a mechanical path partially correct for the low efficiency at high speed ratios of the normal torque converter, but reduces the overall torque multiplication, involve considerably more parts and expensive construction and in the final analysis do not obtain the efficiency of the present construction.

A further examination of the graphs shown in Figures 4 and 5 will bring out the fact that the present invention utilizes the maximum possible starting torque ratio, as shown by the curve 91, thus eliminating the need for reduction gearing to improve starting torque performance. This is not possible with the normal converter, since to obtain a maximum efficiency at as high a speed ratio as possible, starting torque ratio must be sacrificed.

Figure 9:
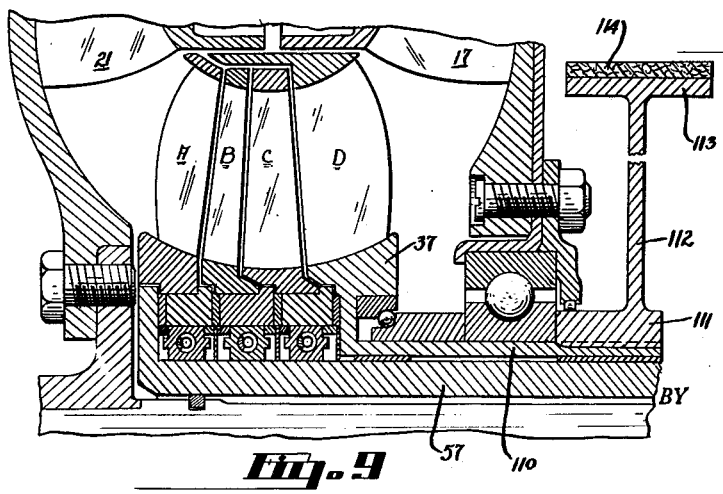
Figure 9 is a fragmentary cross sectional view similar to Figure 1 but showing a modification.

Reference is now made to the modification shown in Figure 9 which is generally the same in construction as the embodiment shown in Figure 1. However, the overrunning brake 64 between the last reaction section D and the fixed sleeve 57 has been eliminated, and the hub 37 of the section D is provided with an axially extending sleeve 110, the latter being splined to the hub 111 of a brake drum 112. The brake drum 112 has a braking flange 113 adapted to be engaged by a friction brake 114 provided with suitable actuating means (not shown) under the control of the driver. With the brake 114 disengaged, the reaction section D floats freely, and the performance of the torque converter is determined by the characteristics of the reaction sections A, B and C. When it is desired to retain one reaction section in the circuit, even at speeds above the normal coupling point, the brake 114 may be applied to the braking flange 113 of the brake drum to hold the reaction section D stationary. With this arrangement, the torque converter does not become a fluid coupling at the normal coupling point, but the reaction section D remains fixed and the performance characteristics of the converter can be thus selected as desired.

It will be understood that the invention is not to be limited to the exact construction shown and described, but that various changes and modifications may be made without departing from the spirit and scope of the invention, as defined in the appended claims.

What is claimed is:

1. In a hydraulic torque converter, an impeller, a turbine, a plurality of reaction elements forming with said impeller and said turbine a fluid circuit, one-way brakes associated with certain of said reaction elements for permitting rotation of said reaction elements in one direction while preventing rotation in the opposite direction, and a selectively operated brake associated with another of said reaction elements for locking said last-mentioned element against rotation in both directions.

2. In a hydraulic torque converter, an impeller, a turbine, a plurality of adjacent reaction elements forming with said impeller and said turbine a fluid circuit, mounting means for the last of said reaction elements permitting rotation of the latter in both directions, a brake associated with said last reaction section and selectively operable to prevent rotation of said section in either direction, and a one-way brake associated with each of the other reaction elements and arranged to permit independent rotation of each of said other elements in one directions while preventing rotation thereof in the opposite direction, the blades of said other reaction elements being arranged to provide for successive overrunning of said other elements as the speed ratio increases.

3. In a hydraulic converter, an impeller, a turbine, a plurality of adjacent reaction elements between the output side of said turbine and the input side of said impeller, and a plurality of blades carried by each of said reaction elements, the largest number of blades being carried by the reaction element immediately adjacent the output of said turbine with a progressively decreasing number of blades being carried by each succeeding reaction element, the number of blades carried by each reaction element being a prime number.

4. In the hydraulic torque converter having an impeller and a turbine, core sections for said impeller and turbine, said core sections being separated from each other by a clearance space and being of complementary shape and each being provided with a cylindrical face along one side with the cylindrical faces in axial alignment, a plurality of independently rotatable reaction elements cooperating with said impeller and said turbine to form a fluid circuit and each being provided with an outer core section in the form of an annular ring, the outer core section of all but one of said reaction elements being substantially coextensive in width with the width of the outer portion of the blade of the respective reaction element, and the core section of the other reaction element having a portion substantially coextensive in width with the width of the outer portion of the blade of said last-mentioned reaction element and also having an annular flange located radially outwardly from the core sections of the other reaction elements and having a sufficient lateral extent to overlap said other core sections, the radially outer face of the elongated core section of said last-mentioned reaction element being cylindrical in shape and being arranged adjacent the aforementioned cylindrical faces of the core sections of said impeller and turbine and overlapping the clearance space between the core sections of said impeller and turbine.

JOHN F. SWIFT.

REFERENCES CITED

The following references are of record in the file of this patent:

UNITED STATES PATENTS

| Number | Name | Date |
|---|---|---|
| 1,760,397 | Coats | May 27, 1930 |
| 1,760,480 | Coats | May 27, 1930 |
| 1,965,518 | Wilson | July 3, 1934 |
| 2,037,252 | Martyrer et al. | Apr. 14, 1936 |
| 2,173,604 | Dodge | Sept. 19, 1939 |
| 2,196,585 | Gette | Apr. 9, 1940 |
| 2,216,411 | Heppner | Oct. 1, 1940 |
| 2,318,660 | Barrett | May 11, 1943 |
| 2,341,163 | Schjolin | Feb. 8, 1944 |

FOREIGN PATENTS

| Number | Country | Date |
|---|---|---|
| 613,838 | Germany | June 1, 1935 |